United States Patent [19]

Doto

[11] 4,077,674
[45] Mar. 7, 1978

[54] LINEARLY OPERATIVE ELECTRIC/FLUID PRESSURE VALVE DEVICE

[75] Inventor: Shigeaki Doto, Kobe, Japan

[73] Assignee: The Nippon Air Brake Co., Ltd., Kobe, Japan

[21] Appl. No.: 737,091

[22] Filed: Oct. 29, 1976

Related U.S. Application Data

[63] Continuation of Ser. No. 593,685, Jul. 7, 1975, abandoned.

[30] Foreign Application Priority Data

Jul. 27, 1974 Japan .............................. 49/90026

[51] Int. Cl.$^2$ .............................................. B60T 15/02
[52] U.S. Cl. ....................................... 303/40; 251/129
[58] Field of Search ................. 137/627.5; 188/181 A, 188/181 R; 251/129; 303/3, 13, 1 S, 20, 40

[56] References Cited

U.S. PATENT DOCUMENTS

| | | | |
|---|---|---|---|
| 2,545,512 | 3/1951 | Campbell | 303/40 |
| 2,985,490 | 5/1961 | Gates | 303/40 |
| 3,071,147 | 1/1963 | Dudzinski | 303/40 X |
| 3,791,408 | 2/1974 | Saitou et al. | 137/529 |
| 3,857,615 | 12/1974 | Acar | 137/627.5 X |
| 3,878,859 | 4/1975 | Grob et al. | 251/129 X |

FOREIGN PATENT DOCUMENTS

| | | | |
|---|---|---|---|
| 1,530,730 | 8/1969 | Germany | 303/40 |
| 375,938 | 10/1939 | Italy | 303/20 |

*Primary Examiner*—Duane A. Reger
*Attorney, Agent, or Firm*—R. W. McIntire, Jr.

[57] ABSTRACT

An electrically controlled, fluid pressure operated valve device in which an electro-magnet is energized to produce magnetic force in response to which a self-lapping valve assembly is actuated to provide output fluid pressure according to the degree of energization of the electro-magnet. A bias spring is provided to counteract the magnetic force acting on the self-lapping valve assembly in order to withhold actuation thereof until the degree of energization of the electro-magnet exceeds a value above which a linear relationship exists between the electro-magnetic coil current and magnetic force produced.

9 Claims, 2 Drawing Figures

4,077,674

LINEARLY OPERATIVE ELECTRIC/FLUID PRESSURE VALVE DEVICE

This is a continuation of application Ser. No. 593,685, filed July 7, 1975 now abandoned.

BACKGROUND OF THE INVENTION

Figure 1:
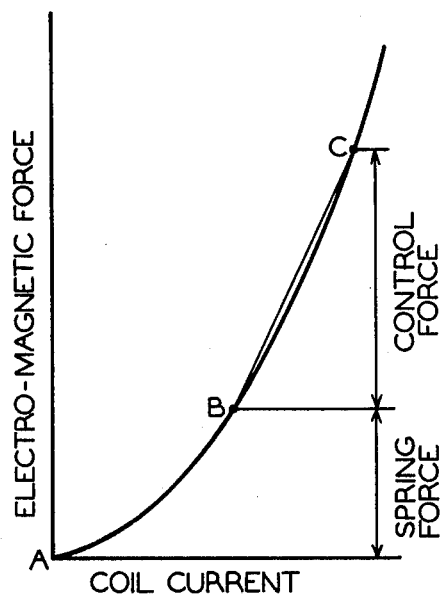

In fluid pressure operated railway brake systems, there often arises a need for converting an electrically derived signal into a fluid pressure signal suitable for direct use with the fluid pressure equipment. Conventional electro/pneumatic relay valves of the well-known self-lapping type are known to have the ability to reliably and economically provide this desired signal conversion, but not without non-linearity. This non-linearity is attributed to unavoidable properties characteristic of the magnetic circuitry on which the electro-pneumatic operation is predicated and is a limiting factor of considerable importance. In FIG. 1 of the drawings is shown a characteristic magnetic force versus coil current curve illustrating this undesirable non-linearity, which exists for the most part in the lower region of the curve, becoming substantially rectilinear near the upper region of the curve.

From the foregoing, it becomes a rather obvious solution where precise control is desired to either avoid operation of the relay valve in the non-linear region of the characteristic curve or else modify the relay valve output in the non-linear region so as to exhibit a linear characteristic. In accordance with the latter solution, conventional techniques for linearizing the curvilinear portion of the characteristic curve involves the use of a constant-current controlling amplifier for controlling the input current to the relay valve electro-magnetic coil. Such techniques, however, require complicated control circuitry to make the degree of amplification vary inversely with the slope of the characteristic curve in the non-linear region and do not justify the expense involved relative to the degree of linearity obtained.

SUMMARY OF THE INVENTION

It is the object of the present invention, therefore, to provide an electro-pneumatic relay valve device which is rendered non-responsive to electrical input signals which lie in the non-linear region of the characteristic curve representing magnetic force versus coil current.

In achieving this objective, the piston valve assembly of a self-lapping electro-pneumatic relay valve device is provided with a biasing spring, which acts on the piston valve assembly in opposition to the magnetic force input from the relay valve coil. The piston valve assembly comprises the exhaust valve seat, which is disengaged from the poppet valve element by the biasing spring until the input signal to the coil generates sufficient electro-magnetic force to overcome the spring. Until this occurs, the delivery port of the relay valve is connected to atmosphere past the open exhaust valve and consequently no output signal is produced in the non-linear region of the characteristic magnetic force versus coil current curve. The spring value is selected so that the electro-magnetic force of the coil overcomes the spring and thereby closes the exhaust valve and at the same time opens the supply valve when the input signal to the coil is within the rectilinear region of the curve. The supply valve comprises the aforesaid poppet valve element, which is normally engaged with an annular supply valve seat that surrounds the exhaust valve seat and is adapted to be unseated by engagement with the exhaust valve seat to thereby effect the supply of fluid pressure to the delivery port of the relay valve in proportion to the electrical input signal to the relay valve coil.

Figure 2:
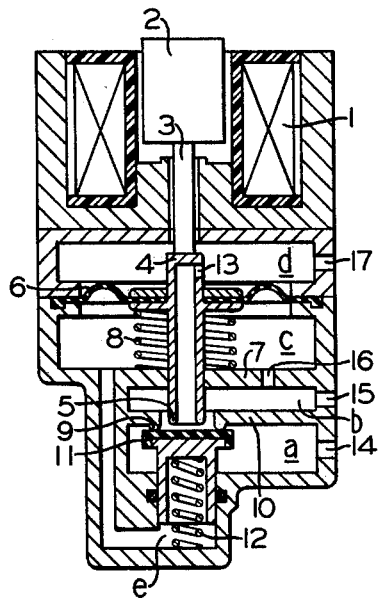

Other objects and advantages of the present invention will become apparent from the following more detailed explanation when taken with the accompanying drawings in which:

FIG. 1 is a graph in which is plotted a characteristic curve representing magnetic force of a coil versus the coil current; and FIG. 2 is a section view of an electro-pneumatic relay valve arranged according to the invention.

DESCRIPTION AND OPERATION

Referring now to FIG. 2 of the drawings, there is shown an electro-pneumatic relay valve device having an electro-magnetic coil 1, with a movable iron core 2 that produces a variable magnetic force according to the amount of coil current effective. A connecting rod 3 that passes through a guide bore in the valve cover connects the core 2 to a valve stem 4 having an annular exhaust valve seat 5 formed at its lower end. Valve stem 4 is fixed to the inner periphery of a diaphragm 6 whose outer periphery is fixed to the valve body. Located between a dividing wall 7 through which stem 4 passes and the connection of diaphragm 6 with stem 4 is a spring 8, which is installed in such a way that no spring deflection will occur until the force imposed on it exceeds a preselected value. In surrounding relationship with exhaust valve seat 5 is an annular supply valve seat 9 on a dividing wall 10 that separates a primary pressure chamber $a$ from a secondary pressure chamber $b$. The upper surface of a poppet type valve element 11 is normally held against supply valve seat 9 by a spring 12, while spring 8 holds exhaust valve seat 5 disengaged from valve element 11 in the absence of energizing current at coil 2 sufficient to overcome the spring bias force. In the unseated condition of exhaust valve seat 5, pressure chamber $b$ is communicated with an exhaust chamber $d$ on the upper side of diaphragm 6 via a central passage and port 13 in valve stem 4. Formed on the underside of diaphragm 6 is a feedback pressure chamber $c$, which is communicated with a chamber $e$ on the spring side of poppet valve element 11. Primary pressure chamber $a$ is provided with an inlet port 14 to which fluid under pressure may be supplied, while secondary pressure chamber $b$ is provided with an outlet port 15 for the delivery of fluid pressure. Fluid delivery pressure in chamber $b$ is connected to chamber $c$ via passageway 16 in the wall separating chambers $b$ and $c$. Exhaust chamber $d$ is provided with a port 17 via which exhaust pressure is connected to atmosphere.

As shown in FIG. 2, electro-magnetic coil 1 is deenergized so that the movable valve elements 5 and 11 are under the influence of springs 8 and 12 respectively. When energized, an electro-magnetic force is produced which acts on the movable iron core 2 to exert a downward force on valve stem 4 via connecting rod 3. Until the electro-magnetic force becomes great enough to overcome the tension of spring 8, however, there will be no deflection of stem 4 and consequently, no delivery pressure is developed at output port 15. Assuming the value of spring 8 is such as to withstand deflection when the electro-magnetic forces are developed in response to coil current corresponding to a range between points A and B on the graph of FIG. 1, it will be apparent that no output signal whatsoever will occur in this non-linear region of the coil current versus magnetic force curve.

Now, as the degree of energization of coil 1 increases to a value lying within the range between points B and C in the graph of FIG. 1, the electro-magnetic forces will overcome the bias force of spring 8 to move valve stem 4 downward. As exhaust valve 5 engages valve element 11, secondary pressure chamber $b$ is cut-off from exhaust chamber $d$ and valve element 11 is subsequently unseated from supply valve seat 9, connecting secondary chamber $b$ with supply fluid pressure in primary chamber $a$. The delivery fluid pressure thus supplied to secondary chamber $b$ is connected via passageway 16 to feedback chamber $c$ where the fluid pressure acts on diaphragm 6 to cooperate with spring 8 in exerting an upward force on valve stem 4 in opposition to the downward acting magnetic force provided by coil 1.

When these forces acting on valve stem 4 are balanced, spring 12 acting through poppet valve element 11 will move valve stem 4 upwardly, while maintaining contact with exhaust valve seat 5 until the poppet valve engages its supply valve seat 9. At this point both the supply and exhaust of fluid pressure is cut-off by the self-lapping action of the valve assembly, and the degree of fluid pressure delivered via outlet port 15 in accordance with the degree of energization of coil 1 is maintained constant until a further change in either the coil current or delivery pressure occurs. It will be appreciated, therefore, that the delivery of fluid pressure at outlet port 15 is determined by the force difference between the electro-magnetic force and the force of spring 8.

When the electro-magnetic force is subsequently reduced, in accordance with coil 1 being either totally or partially deenergized, the balanced force relationship on the valve assembly is destroyed, with the predominent force being exerted by spring 8 to lift valve stem 4 upwardly. As a result, exhaust valve seat 5 becomes disengaged from valve element 11, thereby communicating secondary chamber $b$ with exhaust chamber $d$ via passage 13 in valve stem 4 to reduce the delivery pressure at port 15 in accordance with the reduced magnetic force.

From the foregoing, it can be seen that no delivery pressure is provided at outlet port 15 until the electro-magnetic force reaches a certain preset value, as determined by spring 8 in accordance with point B on the coil current versus magnetic force curve. Consequently, the relay valve device is, in effect, nonoperative in response to coil current within the non-linear region between points A and B of the characteristic coil current versus magnetic force curve, becoming operative in the linear portion of the curve between points B and C. In this way, the fluid pressure developed at output port 15 is substantially linearly proportional to the electro-magnetic coil current.

It will be further appreciated that under normal conditions, i.e., in the absence of any electro-magnetic force, valve stem 4 is positioned by spring 8, as shown, so that exhaust valve seat 5 is disengaged from valve element 11, whereby any pressure from another system which inadvertently enters port 15 is always connected to atmosphere, so that the pressure in secondary chamber $b$ remains at atmospheric pressure.

According to the present invention, as fully explained above, the simple addition of a bias spring to a conventional electro-pneumatic self-lapping valve enables one to achieve fluid pressure control in linear proportion to coil current without resorting to high additional expense.

Having now described the invention what I claim as new and desire to secure by Letters Patent, is:

1. An electrically controlled, fluid pressure operated valve device comprising:
   (a) a self-lapping valve assembly operative to provide a fluid output pressure according to the actuating force exerted thereon;
   (b) electro-magnetic means subject to an electrical input signal for generating a magnetic force to provide said actuating force on said self-lapping valve assembly, said electro-magnetic means exhibiting a characteristic coil current versus magnetic force curve having a non-linear region in which said electro-magnetic means operates when said electrical input signal is below a predetermined value and a linear region in which said electro-magnetic means operates when said input signal exceeds said predetermined value; and
   (c) means for providing a bias force in opposition to said magnetic force to thereby withhold operation of said self-lapping valve assembly until said electrical input signal exceeds said preselected value, whereby said fluid output pressure is accordingly proportional to said input signal.

2. An electrically controlled, fluid pressure operated valve device as recited in claim 1, wherein said means for providing a bias force is a spring.

3. An electrically controlled, fluid pressure operated valve device as recited in claim 2, wherein said spring acts on said self-lapping valve assembly.

4. An electrically controlled, fluid pressure operated valve device, the casing of which forms first, second and third chambers, said first and second chambers having a separating wall common thereto, said valve device comprising:
   (a) a self-lapping valve assembly operative to provide fluid output pressure proportional to an input signal providing the electrical control for said valve device, said self-lapping valve assembly comprising:
      (i) a first valve seat formed about an opening in said wall, said first and second chambers being interconnected via said opening;
      (ii) a movable valve element cooperative with said first valve seat to control fluid pressure communication between said first and second chambers via said opening;
      (iii) means for biasing said valve element toward engagement with said first valve seat; and
      (iv) a movable member having a second valve seat formed at one end thereof and a passageway extending from said second valve seat into said third chamber, said second valve seat being engageable with said valve element; and
   (b) electro-magnetic means subject to said input signal for effecting operation of said valve assembly, said electro-magnetic means exhibiting a characteristic coil current versus magnetic force curve having a non-linear region in which said electro-magnetic means operates when said input signal is below a predetermined value and a linear region in which said electro-magnetic means operates when said input signal exceeds said predetermined value, said electro-magnetic means comprising:

(i) a coil via which an electric current is passed in accordance with the intensity of input signal to produce a magnetic flux field;

(ii) a movable core responsive to the magnetic field flux, said core being engageable with the other end of said movable member to exert a magnetic force thereon in a first direction in which said second valve seat is moved toward engagement with said valve element to interrupt fluid pressure communication between said second and third chambers via said passageway in said movable member and to subsequently effect movement of said valve element away from said first valve seat to establish fluid pressure communication between said first and second chambers via the opening in said wall; and (c) means for providing a bias force in opposition to the magnetic force acting on said movable member to withhold operation of said valve assembly until said electrical input signal exceeds said preselected value, whereby said fluid output pressure is accordingly proportional to said input signal.

5. An electrically controlled, fluid pressure operated valve device as recited in claim 4, wherein said movable member comprises a fluid pressure motor subject to fluid pressure in said second chamber to exert a force on said movable member counteracting said magnetic force to thereby effect movement of said movable member in a direction opposite said first direction to allow said valve element to engage said second valve seat and cut off further fluid pressure communication between said first and second chambers when said counteracting force balances said magnetic force less said bias force.

6. An electrically controlled, fluid pressure operated valve device as recited in claim 5, wherein said fluid pressure motor comprises a diaphragm operated piston subject on one side to fluid pressure in said second chamber and on the other side to fluid pressure in said third chamber.

7. An electrically controlled, fluid pressure operated valve device as recited in claim 6, further characterized in that said third chamber is subject to atmospheric fluid pressure and said second chamber is subject to fluid pressure supplied via said first chamber to provide said fluid output pressure.

8. An electrically controlled, fluid pressure operated valve device as recited in claim 6, further characterized in that said means providing said bias force is a spring.

9. An electrically controlled, fluid pressure operated valve device as recited in claim 8, wherein said spring is disposed in said second chamber so as to act on said diaphragm operated piston.

* * * * *